(12) United States Patent
Fukumoto

(10) Patent No.: US 9,641,078 B2
(45) Date of Patent: May 2, 2017

(54) SWITCHING POWER SUPPLY DEVICE

(71) Applicant: Rohm Co., Ltd., Kyoto (JP)

(72) Inventor: Yosuke Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/189,583

(22) Filed: Jun. 22, 2016

(65) Prior Publication Data

US 2016/0380539 A1   Dec. 29, 2016

(30) Foreign Application Priority Data

Jun. 24, 2015  (JP) .................................. 2015-126935

(51) Int. Cl.
| | | |
|---|---|---|
| *G05F 1/565* | (2006.01) | |
| *G05F 1/00* | (2006.01) | |
| *H02M 3/158* | (2006.01) | |
| *H02M 1/08* | (2006.01) | |
| *H02M 1/00* | (2006.01) | |

(52) U.S. Cl.
CPC ............. *H02M 3/158* (2013.01); *H02M 1/08* (2013.01); *H02M 2001/0009* (2013.01)

(58) Field of Classification Search
CPC . G05F 1/56; G05F 1/565; G05F 1/575; G05F 1/59; G05F 1/595; H02M 3/158
USPC .......................... 323/274, 275, 283–285, 288
See application file for complete search history.

(56) References Cited

U.S. PATENT DOCUMENTS

| | | | | |
|---|---|---|---|---|
| 8,319,487 B2 * | 11/2012 | Michishita | ............ | H02M 3/156 323/223 |
| 8,493,050 B2 * | 7/2013 | Miyamae | ............... | H02M 3/156 323/284 |
| 2004/0095105 A1 * | 5/2004 | Nakata | ....................... | G05F 1/56 323/280 |
| 2007/0120548 A1 * | 5/2007 | Kojima | ............... | H02M 3/1588 323/284 |
| 2007/0170904 A1 | 7/2007 | Hojo | | |
| 2011/0018516 A1 * | 1/2011 | Notman | ............... | H02M 3/1588 323/284 |
| 2012/0038341 A1 * | 2/2012 | Michishita | ............ | H02M 3/158 323/284 |
| 2014/0077790 A1 * | 3/2014 | Sohma | ................ | H02M 3/1588 323/313 |

FOREIGN PATENT DOCUMENTS

JP         4721905         4/2011

* cited by examiner

*Primary Examiner* — Adolf Berhane
*Assistant Examiner* — Gary Nash
(74) *Attorney, Agent, or Firm* — Fish & Richardson P.C.

(57) ABSTRACT

A switching power supply device includes a switching output circuit, an error amplifier, a slope voltage generating circuit, a PWM comparator, a logic circuit, a switch driving circuit, and a reverse current detection circuit. The slope voltage generating circuit increases a slope voltage from a reset level with a gradient corresponding to an input voltage during an on period of the output transistor, and maintains the slope voltage at an offset level corresponding not to the reset level but to an output voltage during an off period of the output transistor.

10 Claims, 14 Drawing Sheets

SWITCHING POWER SUPPLY DEVICE

CROSS-REFERENCE TO RELATED APPLICATIONS

This application claims priority based on Japanese Patent Applications No. 2015-126935 filed on Jun. 24, 2015, the contents of which are hereby incorporated by reference.

BACKGROUND OF THE INVENTION

Field of the Invention

The present invention relates to a switching power supply device.

Description of Related Art

Conventionally, pulse width modulation (PWM) drive type switching power supply devices are generally and widely used as power supply devices of various applications.

The PWM drive type switching power supply device includes, as circuit elements constituting a voltage feedback loop thereof in general, an error amplifier arranged to generate an error voltage corresponding to a difference between an output voltage or a feedback voltage in proportion to the output voltage and a predetermined reference voltage, a slope voltage generating circuit arranged to generate a slope voltage, and a PWM comparator arranged to compare the error voltage with the slope voltage so as to determine an off-timing of the output transistor.

In addition, there is a conventional switching power supply device, which has a function of detecting a reverse current of an inductor current in a light load so as to forcibly turn off a synchronous rectifying transistor (so-called a reverse current cut-off function).

Note that an example of the conventional technique related to the above description is disclosed in Japanese Patent No. 4721905.

However, although the switching power supply device having the reverse current cut-off function can increase efficiency in a light load, it has a problem that a fluctuation range of the error voltage due to a rapid increase in load is large resulting in bad responsiveness to the load (the output voltage largely decreases from a target value).

SUMMARY OF THE INVENTION

In view of the above-mentioned problem found by the inventor, it is an object of the invention disclosed in this specification to provide a switching power supply device having high load responsiveness.

Accordingly, a switching power supply device disclosed in this specification includes a switching output circuit arranged to drive an output inductor by turning on and off an output transistor and a synchronous rectifying transistor, so as to generate an output voltage from an input voltage, an error amplifier arranged to generate an error voltage corresponding to a difference between a predetermined reference voltage and the output voltage or a feedback voltage in proportion to the output voltage, a slope voltage generating circuit arranged to generate a slope voltage, a PWM comparator arranged to compare the error voltage with the slope voltage so as to generate a comparison signal, a logic circuit arranged to receive an input of the comparison signal so as to generate a pulse width modulation signal, a switch driving circuit arranged to receive an input of the pulse width modulation signal so as to generate a drive signal of the switching output circuit, and a reverse current detection circuit arranged to detect a reverse current of an inductor current that flows in the output inductor so as to forcibly turn off the synchronous rectifying transistor. The slope voltage generating circuit increases the slope voltage from a reset level with a gradient corresponding to the input voltage during an on period of the output transistor, while it maintains the slope voltage not at the reset level but at an offset level corresponding to the output voltage during at least a part of an off period of the output transistor.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

<Switching Power Supply Device>

Figure 1:
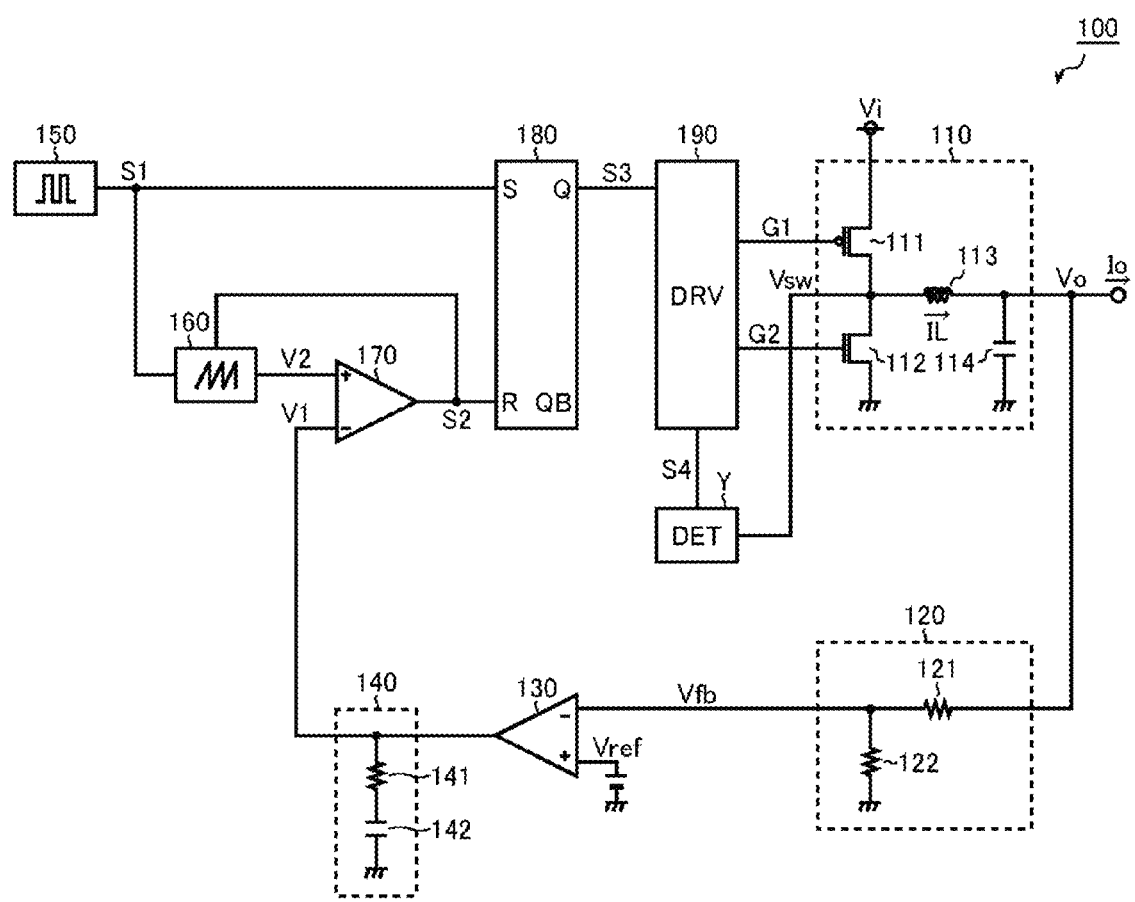
FIG. 1 is a block diagram illustrating a structural example of a switching power supply device.

FIG. 1 is a block diagram illustrating a structural example of a switching power supply device. A switching power supply device 100 of this structural example is a PWM drive type DC/DC converter that generates a desired output voltage Vo from an input voltage Vi and supplies the output voltage to a load (such as a CPU, not shown). The switching power supply device 100 includes a switching output circuit 110, a feedback voltage generating circuit 120, an error amplifier 130, a phase compensation filter 140, a clock signal generate circuit 150, a slope voltage generating circuit 160, a PWM comparator 170, a logic circuit 180, a switch driving circuit 190, and a reverse current detection circuit Y.

Note that the switching power supply device 100 may appropriately include, in addition to the circuit components described above, other protection circuit (such as a low input misoperation prevention circuit or a temperature protection circuit).

The switching output circuit 110 is a step-down type switching output stage that steps down the input voltage Vi so as to generate the desired output voltage Vo. The switching output circuit 110 includes an output transistor 111, a synchronous rectifying transistor 112, an output inductor 113, and an output capacitor 114.

The output transistor 111 is a P channel type metal oxide semiconductor field effect transistor (PMOSFET) that functions as an upper side switch of the switching output stage. A source of the output transistor 111 is connected to an application terminal of the input voltage Vi. A drain of the output transistor 111 is connected to a first terminal of the output inductor 113. A gate of the output transistor 111 is connected to an application terminal of an upper side gate signal G1. The output transistor 111 is turned off when the upper side gate signal G1 is at a high level, while it is turned on when the upper side gate signal G1 is at a low level.

The synchronous rectifying transistor 112 is an N channel type MOSFET (NMOSFET) that functions as a lower side switch of the switching output stage. A source of the synchronous rectifying transistor 112 is connected to a ground terminal (an application terminal of a ground voltage GND). A drain of the synchronous rectifying transistor 112 is connected to the first terminal of the output inductor 113. A gate of the synchronous rectifying transistor 112 is connected to an application terminal of a lower side gate signal G2. The synchronous rectifying transistor 112 is turned on when the lower side gate signal G2 is at the high level, while it is turned off when the lower side gate signal G2 is at the low level.

The output transistor 111 and the synchronous rectifying transistor 112 are complementarily turned on and off in response to the upper side gate signal G1 and the lower side gate signal G2. In accordance with this on/off operation, a switch voltage Vsw is generated at the first terminal of the output inductor 113, and the switch voltage Vsw is pulse-driven between the input voltage Vi and the ground voltage GND so as to have a rectangular waveform. Note that the term "complementarily" described above means not only a case where the output transistor 111 and the synchronous rectifying transistor 112 are turned on and off completely oppositely to each other but also a case where a simultaneous off period of the both transistors (dead time) is set.

The output inductor 113 and the output capacitor 114 constitute an LC filter that rectifies and smooths the switch voltage Vsw so as to generate the output voltage Vo. The first terminal of the output inductor 113 is connected to an application terminal of the switch voltage Vsw. A second terminal of the output inductor 113 and a first terminal of the output capacitor 114 are both connected to an application terminal of the output voltage Vo. A second terminal of the output capacitor 114 is connected to the ground terminal.

Note that an output type of the switching output circuit 110 is not limited to the step-down type described above, but may be any one of a step-up type, a step-up/down type, and an inverting type. In addition, a rectifying type of the switching output circuit 110 is not limited to the synchronous rectifying type described above, but may be a diode rectifying type using a rectifying diode instead of the synchronous rectifying transistor 112.

In addition, if a high voltage is applied to the switching output circuit 110, a high withstand voltage element such as a power MOSFET, an insulated gate bipolar transistor (IGBT), or an SiC transistor should be used as the output transistor 111 and the synchronous rectifying transistor 112.

The feedback voltage generating circuit 120 includes resistors 121 and 122 connected in series between an application terminal of the output voltage Vo and the ground terminal, and outputs a feedback voltage Vfb in proportion to the output voltage Vo (a divided voltage of the output voltage Vo) from a connection node between the both resistors. Further, if the output voltage Vo is within an input dynamic range of the error amplifier 130, the feedback voltage generating circuit 120 can be eliminated so that the output voltage Vo is directly input to the error amplifier 130.

The error amplifier 130 generates an error voltage V1 corresponding to a difference between the feedback voltage Vfb applied to an inverting input terminal (−) and a reference voltage Vref applied to a non-inverting input terminal (+). The error voltage V1 increases when the feedback voltage Vfb is lower than the reference voltage Vref, while it decreases when the feedback voltage Vfb is higher than the reference voltage Vref.

The phase compensation filter 140 includes a resistor 141 and a capacitor 142 connected in series between an application terminal of the error voltage V1 and the ground terminal, and compensate for a phase of the error voltage V1 so as to prevent oscillation of the error amplifier 130.

The clock signal generate circuit 150 generates a clock signal S1 that is pulse-driven at a predetermined switching frequency fsw (=1/T).

The slope voltage generating circuit 160 receives inputs of the clock signal S1 and a comparison signal S2 so as to generate a slope voltage V2 having a triangular waveform, a sawtooth waveform, or an n-th order slope wave (e.g. n=2). For instance, the slope voltage V2 starts to increase by a trigger of a falling edge of the clock signal S1 and is decreased to the reset level (a bias voltage Vb) by a trigger of a rising edge of the comparison signal S2.

The PWM comparator 170 compares the error voltage V1 applied to the inverting input terminal (−) with the slope voltage V2 applied to the non-inverting input terminal (+) so as to generate the comparison signal S2. The comparison signal S2 becomes the low level when the slope voltage V2 is lower than the error voltage V1, while it becomes the high level when the slope voltage V2 is higher than the error voltage V1.

The logic circuit 180 is an RS flip-flop that generates a pulse width modulation signal S3 (hereinafter referred to as a PWM signal S3) in response to the clock signal S1 input to a set terminal (S) and the comparison signal S2 input to a reset terminal (R). For instance, the PWM signal S3 is set to the high level at the falling edge of the clock signal S1, while it is reset to the low level at the rising edge of the comparison signal S2.

The switch driving circuit 190 receives an input of the PWM signal S3 so as to generate the upper side gate signal G1 and the lower side gate signal G2 (corresponding to drive signals of the switching output circuit 110. Basically, the upper side gate signal G1 and the lower side gate signal G2 become the low level when the PWM signal S3 is at the high level, while they become the high level when the PWM signal S3 is at the low level.

The reverse current detection circuit Y monitors a reverse current of an inductor current IL (that flows from the output inductor 113 to the ground terminal via the synchronous rectifying transistor 112) so as to generate a reverse current detection signal S4. The reverse current detection signal S4 is latched to the high level (a logical level when the reverse current is detected) at a time point when the reverse current of the inductor current IL is detected, and is reset to the low level (a logical level when the reverse current is not detected) at a rising edge of the upper side gate signal GI in a next period. Further, as a method of monitoring the reverse current of the inductor current IL, for example, it is preferred to detect a zero cross point at which the switch voltage Vsw is switched from negative to positive during an on period of the synchronous rectifying transistor 112. If the reverse current detection signal S4 is at the high level, the switch driving circuit 190 generates the lower side gate signal G2 so as to forcibly turn off the synchronous rectifying transistor 112 regardless of the PWM signal S3.

<Pulse Width Modulation Control>

Figure 2:
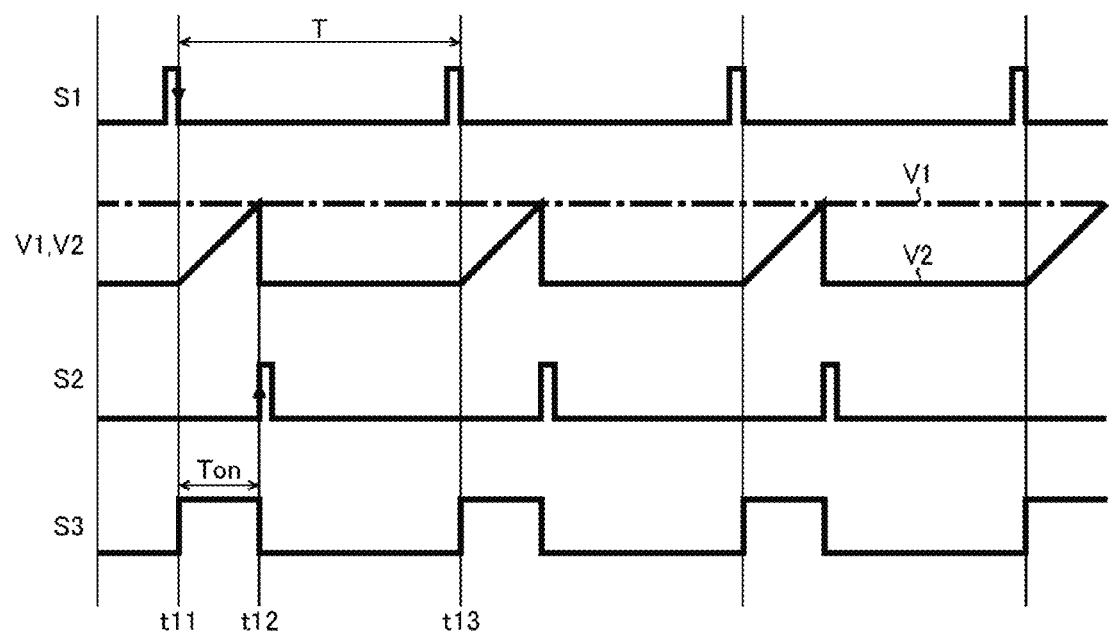
FIG. 2 is a timing chart illustrating an example of a pulse width modulation control.

FIG. 2 is a timing chart illustrating an example of a pulse width modulation control, and shows the clock signal S1, the error voltage V1 and the slope voltage V2, the comparison signal S2, and the PWM signal S3, in order from top to bottom. Note that this chart shows behaviors in an ideal state in which the PWM comparator 170 has no internal delay.

When the clock signal S1 is decreased to the low level at a time point t11, the PWM signal S3 is set to the high level. As a result, the output transistor 111 of the switching output circuit 110 is turned on, while the synchronous rectifying transistor 112 is turned off. In addition, when the clock signal S1 is decreased to the low level at the time point t11, the slope voltage V2 starts to increase with a predetermined gradient.

At a time point t12, when the slope voltage V2 becomes higher than the error voltage V1 so that the comparison signal S2 is raised to the high level, the PWM signal S3 is reset to the low level. As a result, the output transistor 111 of the switching output circuit 110 is turned off, while the synchronous rectifying transistor 112 is turned on. In addition, at the time point t12, when the comparison signal S2 is raised to the high level, the slope voltage V2 is quickly discharged.

With the pulse width modulation control described above, a high level period Ton1 of the PWM signal S3 (an on period of the output transistor 111) becomes longer as the error voltage V1 is higher, while it becomes shorter as the error voltage V1 is lower. In other words, a duty D of the PWM signal S3 (=Ton/T) becomes smaller as the error voltage V1 is higher, while it becomes smaller as the error voltage V1 is lower.

Further, also after a time point t13 when the clock signal S1 is raised to the high level again, the same pulse width modulation control as described above is repeated. Thus, the output transistor 111 and the synchronous rectifying transistor 112 of the switching output circuit 110 are periodically turned on and off so that the output inductor 113 is driven, and hence a desired output voltage Vo is generated.

<Reverse Current Cut-Off Operation>

Figure 3:
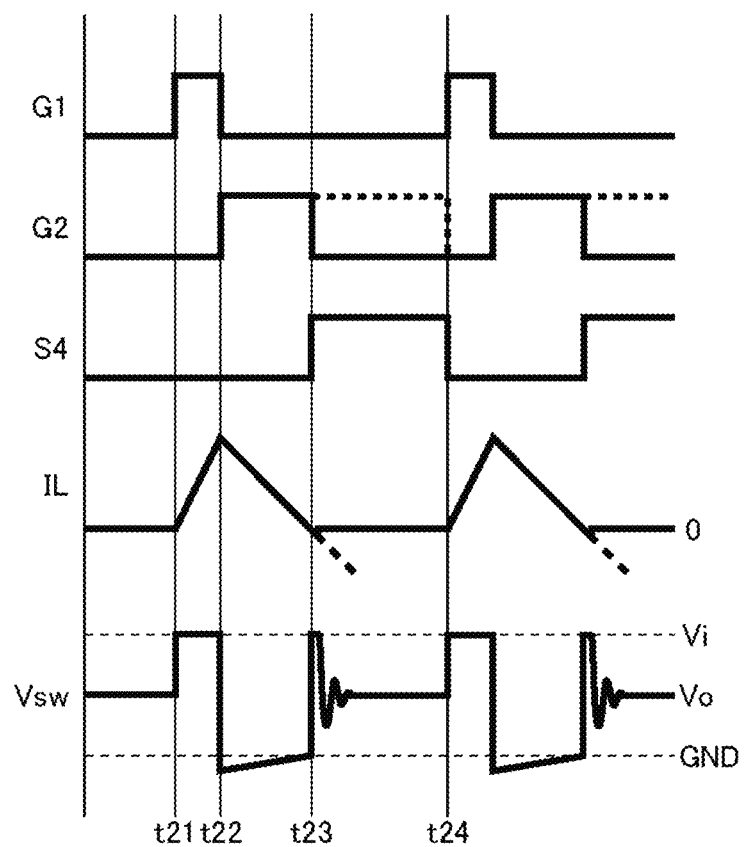
FIG. 3 is a timing chart illustrating an example of a reverse current cut-off operation.

FIG. 3 is a timing chart for explaining a power saving operation in a light load by the reverse current detection circuit Y (a reverse current cut-off operation), and shows the upper side gate signal G1, the lower side gate signal G2, the reverse current detection signal S4, the inductor current IL, and the switch voltage Vsw, in order from top to bottom.

In a period between time points t21 and t22, the upper side gate signal G1 is at the high level while the lower side gate signal G2 is at the low level, and hence the output transistor 111 is turned on while the synchronous rectifying transistor 112 is turned off. Accordingly, in the period between the time points t21 and t22, the switch voltage Vsw is increased to substantially the input voltage Vi so that the inductor current IL increases.

At the time point t22, when the upper side gate signal G1 is decreased to the low level while the lower side gate signal G2 is raised to the high level, the output transistor 111 is turned off, while the synchronous rectifying transistor 112 is turned on. Accordingly, the switch voltage Vsw is decreased to a negative voltage (=GND−IL×RON (i.e., an on resistance value of the synchronous rectifying transistor 112)) so that the inductor current IL is changed to decrease.

Here, in a heavy load with a sufficiently large output current To flowing in the load, energy stored in the output inductor 113 is large, and hence the inductor current IL continues to flow to the load without being below zero until a time point t24 when the upper side gate signal G1 is raised to the high level again, so that the switch voltage Vsw is maintained at a negative voltage. On the other hand, in a light load with a small output current To flowing in the load, the energy stored in the output inductor 113 is small, and hence the inductor current IL becomes below zero at a time point t23. Thus, a reverse current to the synchronous rectifying transistor 112 is generated so that a polarity of the switch voltage Vsw is changed from negative to positive. In this state, the charge stored in the output capacitor 114 is discarded to the ground terminal, and hence an efficiency decrease will be caused in a light load.

Accordingly, the switching power supply device 100 detects the reverse current of the inductor current IL (a polarity inversion of the switch voltage Vsw) using the reverse current detection circuit Y, so as to forcibly turn off the synchronous rectifying transistor 112 in the high level period of the reverse current detection signal S4 (in a period between the time points t23 and t24). With this structure, the reverse current of the inductor current IL can be quickly cut off, and hence the efficiency decrease in a light load can be canceled.

However, in the switching power supply device 100 having the reverse current cut-off function described above, a decreased amount of the output voltage Vo when a load rapidly increases becomes large. In the following description, a cause of deterioration of load responsiveness due to introduction of the reverse current detection circuit Y is described, and then a structure and an operation of the slope voltage generating circuit 160 that can solve the deterioration is described in detail.

<Cause of Deteriorating Load Responsiveness>

Figure 4:
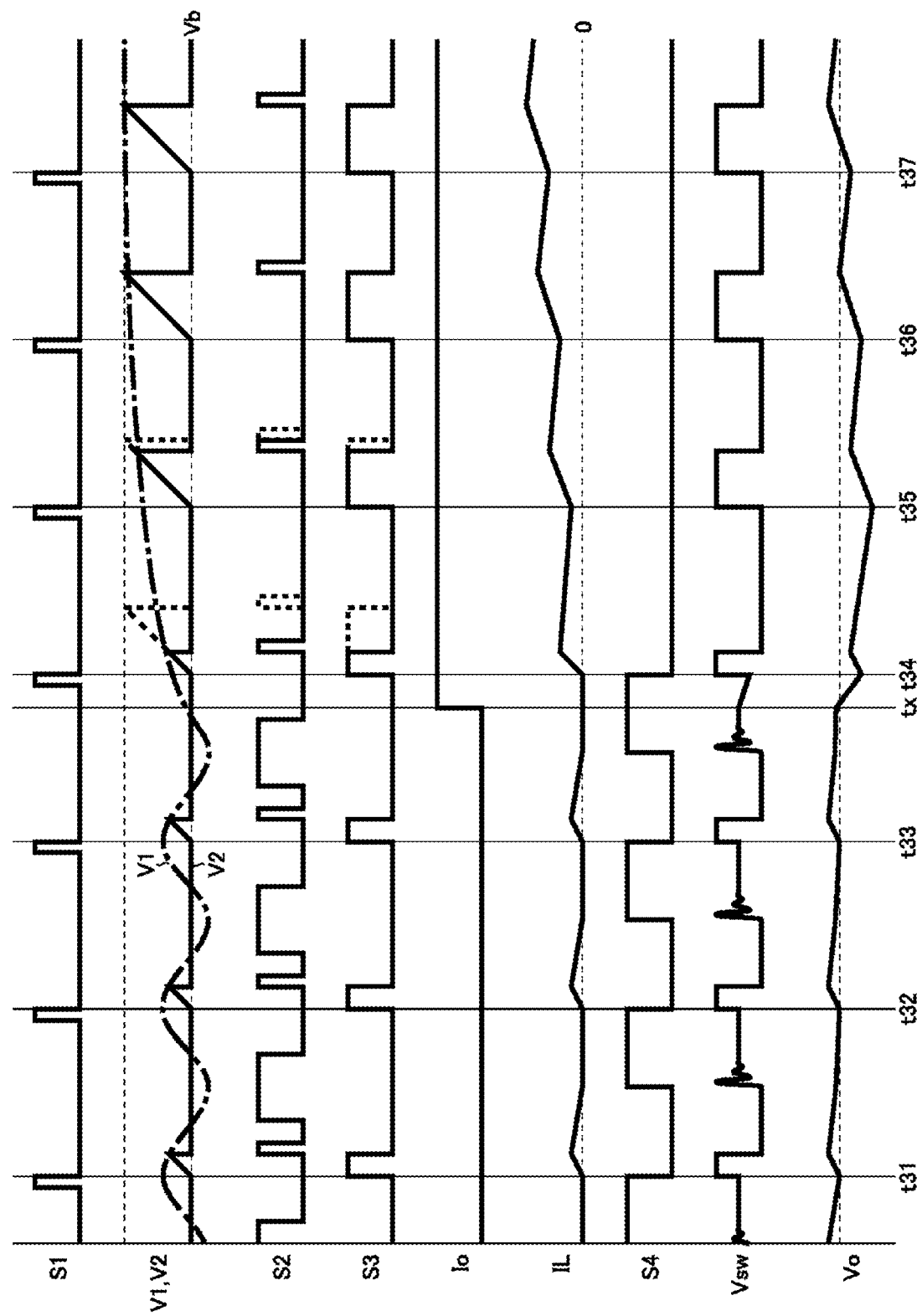
FIG. 4 is a timing chart illustrating a first example of an output fluctuation when a load rapidly increases.

FIG. 4 is a timing chart illustrating a first example of an output fluctuation when a load rapidly increases (a behavior when the slope voltage generating circuit 160 does not have an offset function described later), and shows the clock signal S1, the error voltage V1 (a solid line) and the slope voltage V2 (a dot-dashed line), the comparison signal S2, the PWM signal S3, the output current Io, the inductor current IL, the reverse current detection signal S4, the switch voltage Vsw, and the output voltage Vo, in order from top to bottom.

In a switching period between time points t31 and t32 and in a switching period from the time point t32 to a time point t33, in the same manner as the period between the time points t21 and t24 illustrated in FIG. 3, output behaviors in a light load with a small output current Io are illustrated. In these switching periods, the inductor current IL is below zero during the on period of the synchronous rectifying transistor 112 (a low level period of the PWM signal S3). Accordingly, the reverse current detection signal S4 rises to the high level, and the reverse current cut-off operation described above is performed.

Further, in the first example illustrated in this chart, because the slope voltage generating circuit 160 does not have an offset function described later, the slope voltage V2 is maintained at the reset level (i.e., the bias voltage Vb) during the off period of the output transistor 111 (the low level period of the PWM signal S3). In addition, even if the output transistor 111 is turned off, the output voltage Vo is hardly below the target value in a light load, and hence the error voltage V1 fluctuates at a very low voltage level (close to a reset level of the slope voltage V2).

In a switching period from the time point t33 to a time point t34, a rapid increase of the output current Io (a change from a light load to a heavy load) is generated at a time point tx during the reverse current cut-off operation. In this case, the output transistor 111 and the synchronous rectifying transistor 112 are both turned off. Accordingly, in a period after the time point tx until a next switching period comes, the output current To is supplied only by the charge stored in the output capacitor 114. As a result, after the time point tx, the output voltage Vo and the switch voltage Vsw are decreased along with the lapse of time. In addition, in reflection of a decrease of the output voltage Vo, the error voltage V1 starts to increase to a voltage level corresponding to a difference between the feedback voltage Vfb and the reference voltage Vref.

In a switching period from the time point t34 to a time point t35, the PWM signal S3 rises to the high level by a trigger of the falling edge of the clock signal S1 so that the output transistor 111 is turned on, and hence the output voltage Vo is changed to increase. However, at this time point, the error voltage V1 has not reached an inherent voltage level (i.e., the voltage level corresponding to a difference between the feedback voltage Vfb and the reference voltage Vref). Accordingly, the slope voltage V2 becomes higher than the error voltage V1 just after the start of increase, and hence the comparison signal S2 is raised to the high level. As a result, the on period of the output transistor 111 becomes shorter than the original one, and hence the output voltage Vo cannot be sufficiently raised.

Also in a switching period from the time point t35 to a time point t36 and in a switching period from the time point t36 to a time point t37, the error voltage V1 has not reached the inherent voltage level. As a result, the on period of the output transistor 111 cannot be sufficiently secured, and hence the output voltage Vo is not sufficiently raised.

In this way, in the switching power supply device 100 having the reverse current cut-off function, the error voltage V1 is decreased close to the reset level of the slope voltage V2 in a light load. As a result, when a load rapidly increases, a fluctuation range of the error voltage V1 becomes large, and hence the load responsiveness is deteriorated.

In the following description, as means for improving the load responsiveness, the slope voltage generating circuit 160 having the offset function is proposed.

<Slope Voltage Generating Circuit>

Figure 5:
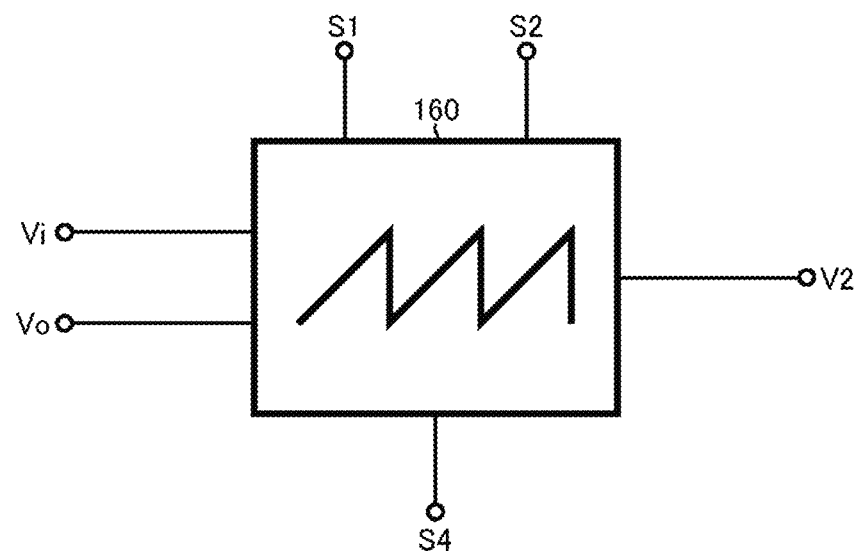
FIG. 5 is a block diagram illustrating an input/output example of a slope voltage generating circuit having an offset function.

FIG. 5 is a block diagram illustrating an input/output example of the slope voltage generating circuit 160 having the offset function. As illustrated in this diagram, the slope voltage generating circuit 160 having the offset function receives inputs of the reverse current detection signal S4, the input voltage Vi, and the output voltage Vo, in addition to the clock signal S1 and the comparison signal S2, so as to generate the slope voltage V2.

More specifically, the slope voltage generating circuit 160 having the offset function generates the slope voltage V2, so that it increases from the reset level (i.e., the bias voltage Vb) with a gradient corresponding to the input voltage Vi during the on period of the output transistor 111, and maintains at an offset level corresponding not to the reset level but to the output voltage Vo during at least a part of the off period of the output transistor 111.

Note that it is possible to input the PWM signal S3 instead of the clock signal S1 and the comparison signal S2 or to eliminate the input of the reverse current detection signal S4. In the following description, a structure and an operation of the slope voltage generating circuit 160 is described in detail with reference to a specific example.

FIRST STRUCTURAL EXAMPLE

Figure 6:
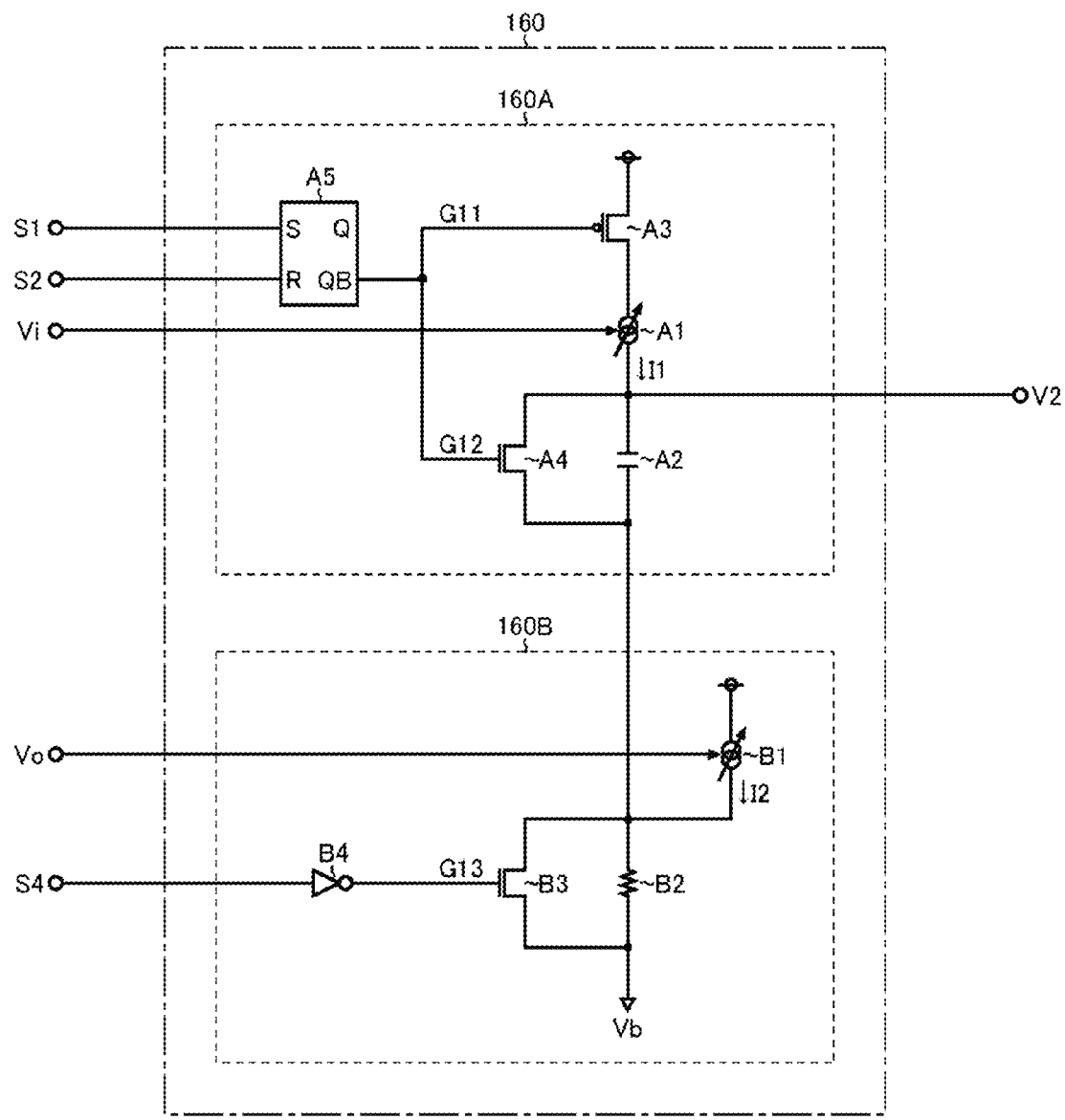
FIG. 6 is a circuit diagram illustrating a first structural example of a slope voltage generating circuit.

FIG. 6 is a circuit diagram illustrating a first structural example of the slope voltage generating circuit 160. The slope voltage generating circuit 160 of the first structural example includes a charge/discharge unit 160A and an offset unit 160B. The charge/discharge unit 160A includes a current source A1, a capacitor A2, switches A3 and A4, and a logic circuit A5. The offset unit 160B includes a current source B1, a resistor B2, a switch B3, and an inverter B4.

The current source A1 is connected between a power supply terminal and an output terminal of the slope voltage V2, and generates a current I1 corresponding to the input voltage Vi. The current I1 becomes larger as the input voltage Vi is higher, while it becomes smaller as the input voltage Vi is lower.

The capacitor A2 has a first terminal connected to the output terminal of the slope voltage V2. When the switch A3 is turned on while the switch A4 is turned off, the capacitor A2 is charged by the current I1, and hence the slope voltage V2 increases with the gradient corresponding to the input voltage Vi. On the other hand, when the switch A3 is turned off while the switch A4 is turned on, both terminals of the capacitor A2 are short-circuited, and hence charge stored in the capacitor A2 is discharged.

The switch A3 is a PMOSFET that is connected between the power supply terminal and the current source A1, and is turned on and off in accordance with a gate signal G11. The switch A3 is turned on during a low level period of the gate signal G11 (during the on period of the output transistor 111) and is turned off during a high level period of the gate signal G11 (during the off period of the output transistor 111).

The switch A4 is an NMOSFET that is connected between both terminals of the capacitor A2, and is turned on and off in accordance with a gate signal G12 (that is the same as the gate signal G11 in the example of this diagram). The switch A4 is turned off during a low level period of the gate signal G12 (during the on period of the output transistor 111) and is turned on during a high level period of the gate signal G12 (during the off period of the output transistor 111).

The logic circuit A5 is an RS flip-flop that outputs a logic signal corresponding to the gate signal G11 or G12 from its inverting output terminal (QB), in response to the clock signal S1 input to the set terminal (S) and the comparison signal S2 input to the reset terminal (R). For instance, the gate signal G11 or G12 are set to the low level at the falling edge of the clock signal S1, while they are reset to the high level at the rising edge of the comparison signal S2.

The current source B1 is connected between the power supply terminal and a first terminal of the resistor B2, and generates a current I2 corresponding to the output voltage Vo. The current I2 becomes larger as the output voltage Vo is higher, while it becomes smaller as the output voltage Vo is lower.

The resistor B2 (having a resistance value R) has a first terminal connected to a second terminal of the capacitor A2, and a second terminal connected to an application terminal of the bias voltage Vb (the reset level of the slope voltage V2). When the switch B3 is turned off, the current I2 flows in a path from the current source B1 to an application terminal of the bias voltage Vb via the resistor B2. Accordingly, the second terminal of the capacitor A2 is applied with a voltage (=Vb+I2×R) obtained by adding the bias voltage Vb and a voltage across both terminals of the resistor B2 (=I2×R). On the other hand, when the switch B3 is turned on, the both terminals of the resistor B2 are short-circuited, and hence the second terminal of the capacitor A2 is applied with the bias voltage Vb.

The switch B3 is an NMOSFET that is connected between the both terminals of the resistor B2, and is turned on and off in response to a gate signal G13 (a logically inverted signal of the reverse current detection signal S4 in the example of this diagram). The switch B3 is turned on during the high level period of the gate signal G13 (when the reverse current of the inductor current IL is not detected), while it is turned off during the low level period of the gate signal G13 (when the reverse current of the inductor current IL is detected).

The inverter B4 logically inverts the reverse current detection signal S4 so as to generate the gate signal G13.

Further, the charge/discharge unit 160A having the structure described above allows the current I1 corresponding to the input voltage Vi to flow in the capacitor A2 so as to generate the slope voltage V2. In addition, the offset unit 160B having the structure described above allows the current I2 corresponding to the output voltage Vo to flow in the resistor B2 so as to add an offset (=I2×R) to the slope voltage V2.

Figure 7:
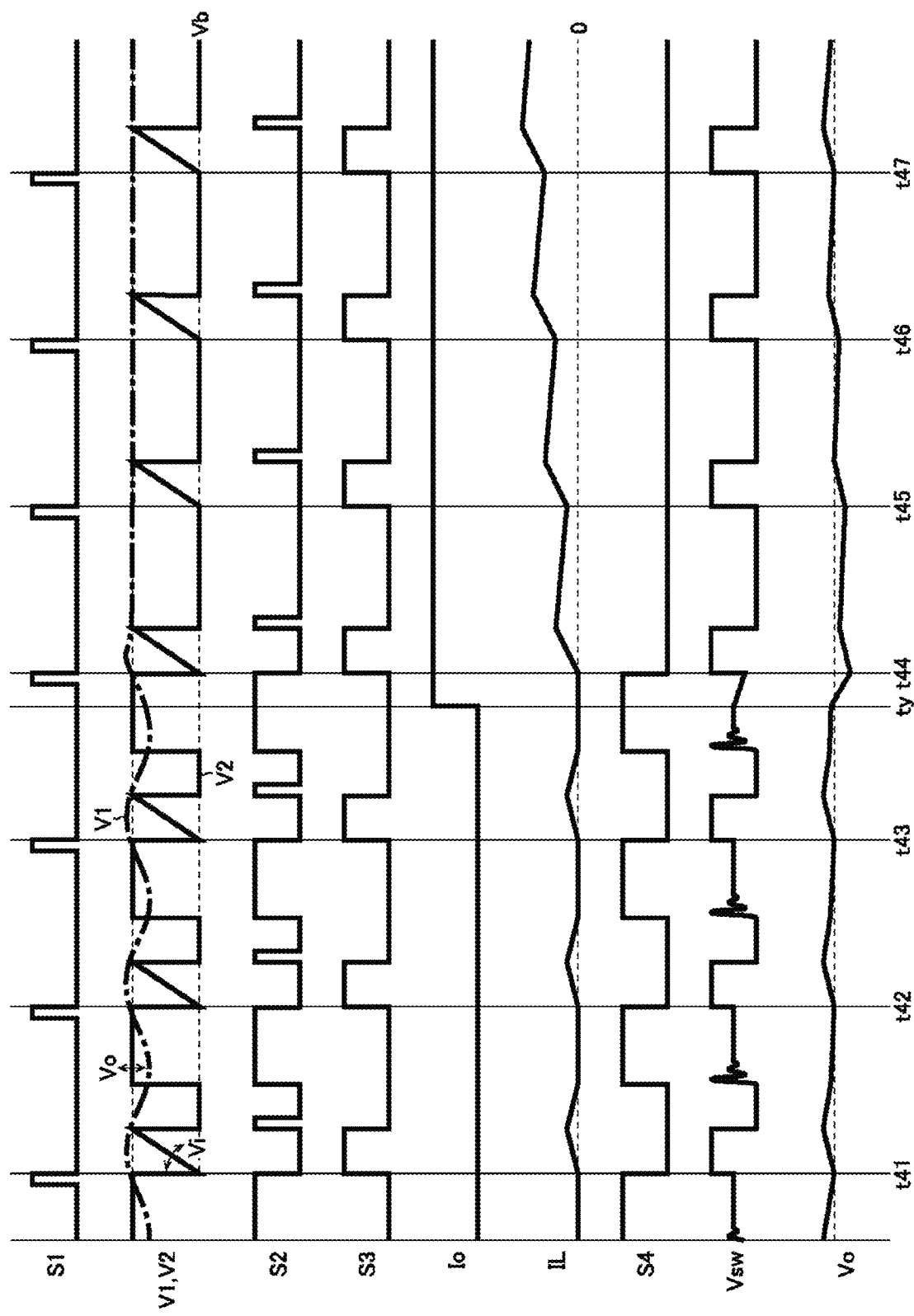
FIG. 7 is a timing chart of a second example of the output fluctuation when a load rapidly increases.

FIG. 7 is a timing chart illustrating a second example of the output fluctuation when a load rapidly increases (a behavior when the slope voltage generating circuit 160 of a first structural example is adopted), and shows the clock signal S1, the error voltage V1 (a solid line) and the slope voltage V2 (a dot-dashed line), the comparison signal S2, the PWM signal S3, the output current Io, the inductor current IL, the reverse current detection signal S4, the switch voltage Vsw, and the output voltage Vo, in order from top to bottom.

In a switching period from a time point t41 to a time point t42, and in a switching period from the time point t42 to a time point t43, in the same manner as the period between the time points t21 and t24 illustrated in FIG. 3, output behaviors in a light load with small output current To are illustrated. In these switching periods, the inductor current IL is below zero during on period of the synchronous rectifying transistor 112 (the low level period of the PWM signal S3). Accordingly, the reverse current detection signal S4 rises to the high level, and the reverse current cut-off operation described above is performed.

Further, in each of the switching periods, the slope voltage V2 is increased from the reset level (i.e., the bias voltage Vb) with the gradient corresponding to the input voltage Vi by a trigger of the falling edge of the clock signal 51, and then is decreased again to the reset level by a trigger of the rising edge of the comparison signal S2.

In addition, in the second example illustrated in this chart, the slope voltage generating circuit 160 has the offset function described above. More specifically, the slope voltage V2 is raised to an offset level corresponding to the output voltage Vo during a detection period of the reverse current of the inductor current IL (a high level period of the reverse current detection signal S4) in the off period of the output transistor 111 (the low level period of the PWM signal S3).

Further, a gradient of the slope voltage V2 depends on the input voltage Vi, while an offset level of the slope voltage V2 depends on the output voltage Vo. Accordingly, a voltage level of the slope voltage V2 at an intersection with the error voltage V1 (a slope height) can agree with the offset level of the slope voltage V2.

With this offset operation, it is possible to intentionally increase the error voltage V1, and hence the error voltage V1 is not decreased close to the reset level of the slope voltage V2 even in a light load.

In a switching period from the time point t43 to a time point t44, a rapid increase of the output current Io (a change from a light load to a heavy load) occurs at a time point ty during the reverse current cut-off operation. In this case, the output transistor 111 and the synchronous rectifying transistor 112 are both turned off. Accordingly, in a period after the time point ty until a next switching period comes, the output current Io is supplied only by the charge stored in the output capacitor 114. As a result, after the time point ty, the output voltage Vo and the switch voltage Vsw are decreased along with the lapse of time. In addition, in reflection of a decrease of the output voltage Vo, the error voltage V1 starts to increase to a voltage level corresponding to a difference between the feedback voltage Vfb and the reference voltage Vref.

In a switching period from the time point t44 to a time point t45, the PWM signal S3 rises to the high level by a trigger of the falling edge of the clock signal S1 so that the output transistor 111 is turned on, and hence the output voltage Vo is changed to increase. In addition, at this time point, the error voltage V1 has already reached the inherent voltage level (i.e., the voltage level corresponding to a difference between the feedback voltage Vfb and the reference voltage Vref). Accordingly, the on period of the output transistor 111 can be sufficiently secured, and hence the output voltage Vo can be quickly raised to the target value.

Also in a switching period from the time point t45 to a time point t46 and in a switching period from the time point t46 to a time point t47, the error voltage V1 has already reached the inherent voltage level, and therefore the output voltage Vo can be quickly increased following the previous switching period.

In this way, with an introduction of the slope voltage generating circuit 160 having the offset function, it is possible to intentionally increase the error voltage V1 in a light load, a fluctuation range of the error voltage V1 when a load rapidly increases becomes small, and hence load responsiveness can be improved.

SECOND STRUCTURAL EXAMPLE

Figure 8:
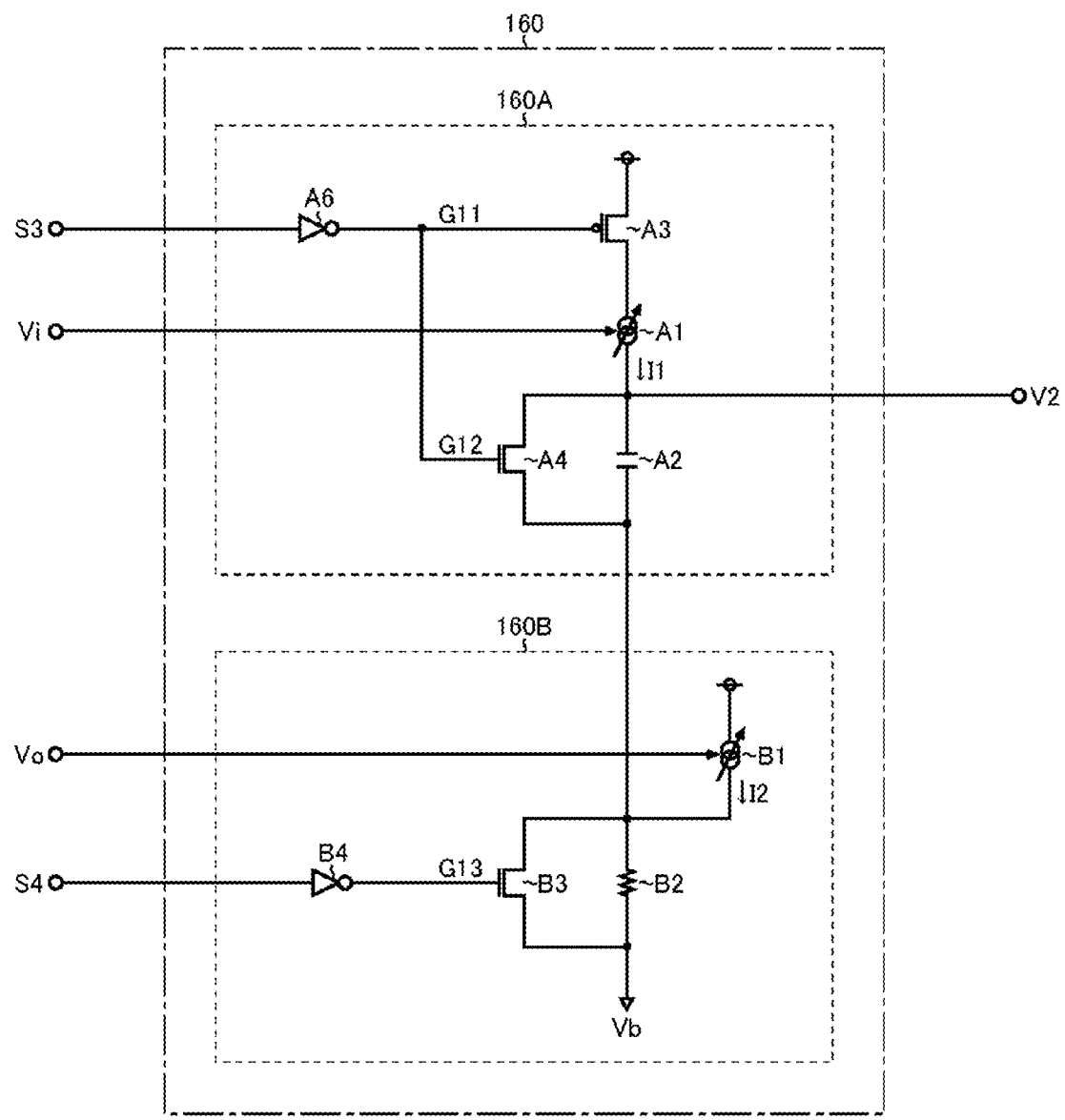
FIG. 8 is a circuit diagram illustrating a second structural example of the slope voltage generating circuit.

FIG. 8 is a circuit diagram illustrating a second structural example of the slope voltage generating circuit 160. The second structural example of this diagram has substantially the same structure as the first structural example described above (FIG. 6), and is characterized in that it includes an inverter A6 that generates the gate signal G11 or G12 by logically inverting the PWM signal S3, instead of the logic circuit A5 that receives inputs of the clock signal S1 and the comparison signal S2 so as to generate the gate signal G11 or G12. By adopting this structure, it is possible to reduce a circuit scale of the slope voltage generating circuit 160.

In addition, it is possible not to receive the input of the PWM signal S3 from an output terminal (Q) but to receive the input of an inverted PWM signal S3B (a logically inverted signal of the PWM signal S3) from an inverting output terminal (QB) of the logic circuit 180. By adopting this structure, the inverter A6 is also unnecessary, and hence the circuit scale can be further reduced.

<Division Variation of Semiconductor Device>

Figure 9A:
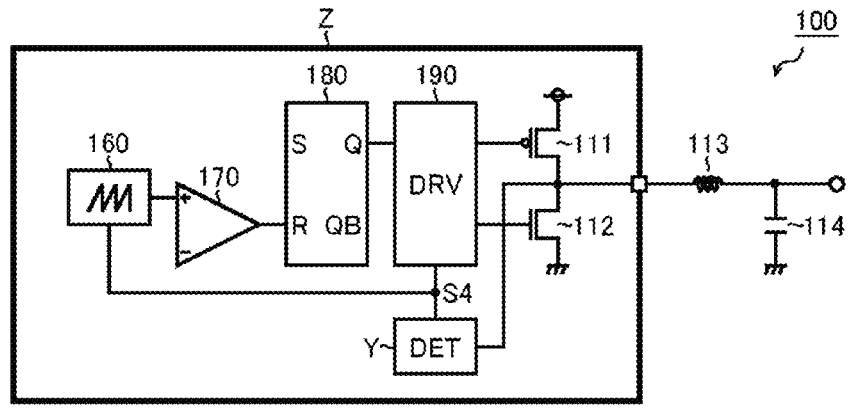
FIG. 9A is a circuit diagram illustrating a division variation (a first division example) of a semiconductor device.
Figure 9B:
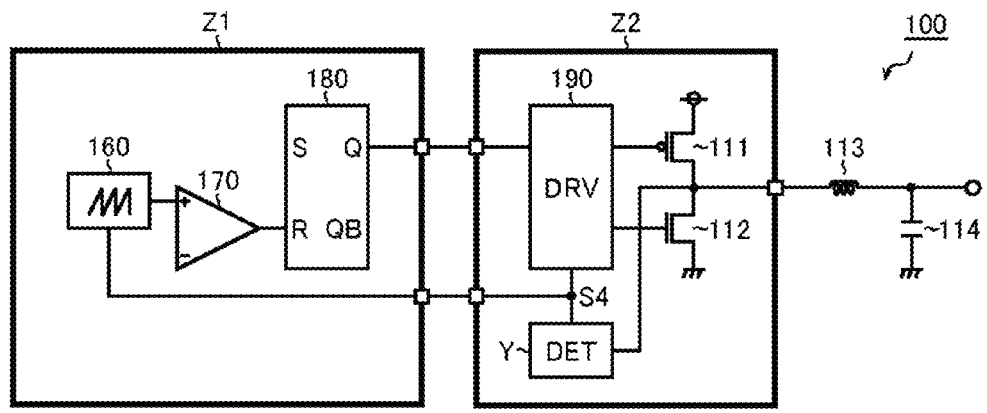
FIG. 9B is a circuit diagram illustrating a division variation (a second division example) of the semiconductor device.
Figure 9C:
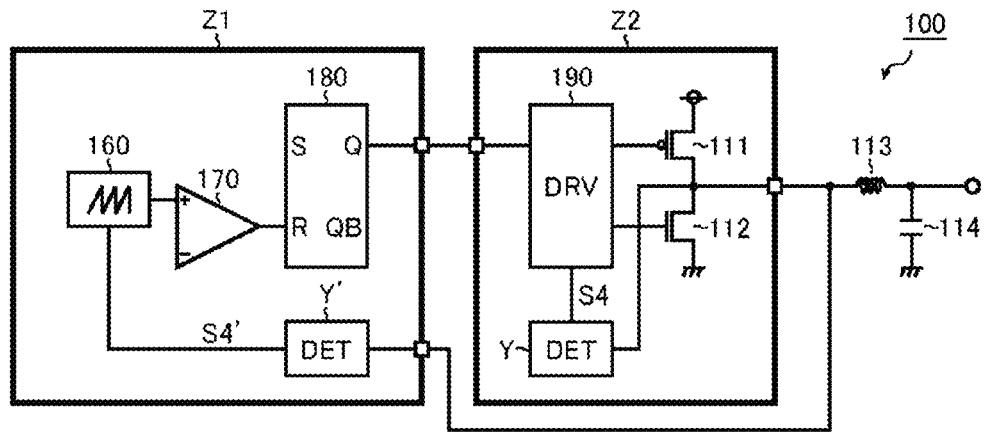
FIG. 9C is a circuit diagram illustrating a division variation (a third division example) of the semiconductor device.

FIGS. 9A to 9C are circuit diagrams respectively illustrating division variations of the semiconductor device. As illustrated in FIG. 9A, if circuit blocks forming the switching power supply device 100 are integrated to a single semiconductor device Z, the reverse current detection signal S4 can be transmitted from the reverse current detection circuit Y to the slope voltage generating circuit 160 inside the semiconductor device Z. Accordingly, when adopting the slope voltage generating circuit 160 of the first structural example (FIG. 6) or the second structural example (FIG. 8), it is not necessary to provide the semiconductor device Z with an additional external terminal.

On the other hand, depending on an application equipped with the switching power supply device 100, as illustrated in FIG. 9B or 9C, there is a case where a controlling semiconductor device Z1 (so-called a controller IC), in which the slope voltage generating circuit 160, the PWM comparator 170, the logic circuit 180, and the like are integrated, is separated from a driving semiconductor device Z2 (so-called a driver IC), in which the switching output circuit 110, the switch driving circuit 190, the reverse current detection circuit Y, and the like are integrated.

In this case, in order to adopt the slope voltage generating circuit 160 of the first structural example (FIG. 6) or the second structural example (FIG. 8), as illustrated in FIG. 9B, it is necessary to dispose additional external terminals in both the semiconductor devices Z1 and Z2, so that the reverse current detection signal S4 is transmitted from the reverse current detection circuit Y of the semiconductor device Z2 to the slope voltage generating circuit 160 of the semiconductor device Z1.

In addition, as in accordance with FIG. 9C, it is possible to adopt a structure in which besides the reverse current detection circuit Y of the semiconductor device Z2, a similar reverse current detection circuit Y' is disposed in the semiconductor device Z1, so that a reverse current detection signal S4' is transmitted from the reverse current detection circuit Y' to the slope voltage generating circuit 160 inside the semiconductor device Z1. However, even if this structure is adopted, it is necessary to provide the semiconductor device Z1 with an additional external terminal for receiving the input of the switch voltage Vsw.

In view of the above description, in the switching power supply device 100 in which the controlling semiconductor device Z1 is separated from the driving semiconductor device Z2, it is assumed that it may be difficult to adopt the slope voltage generating circuit 160 of the first structural example (FIG. 6) or the second structural example (FIG. 8) (e.g., a case where additional external terminals cannot be disposed).

Accordingly, as a next third structural example, there is proposed a structure of the slope voltage generating circuit 160, which can realize the offset function described above without using the reverse current detection signal S4.

THIRD STRUCTURAL EXAMPLE

Figure 10:
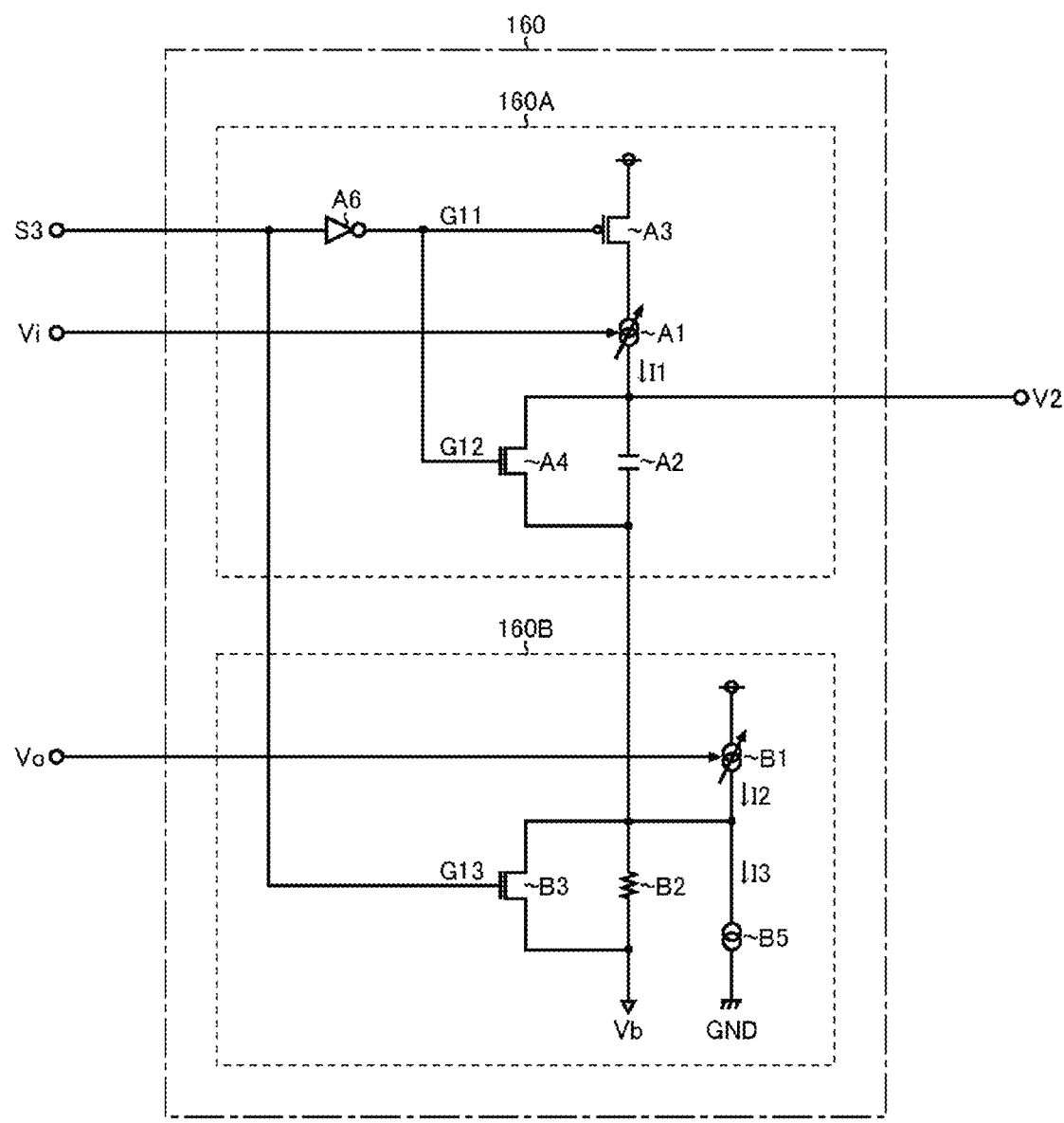
FIG. 10 is a circuit diagram illustrating a third structural example of the slope voltage generating circuit.

FIG. 10 is a circuit diagram illustrating a third structural example of the slope voltage generating circuit 160. The third structural example has substantially the same structure as the second structural example (FIG. 8) described above, and is characterized in that the inverter B4 that receives the input of the reverse current detection signal S4 is eliminated so that the PWM signal S3 is input as the gate signal G13 to the switch B3, and that a current source B5 is added.

The switch B3 receives not the input of the reverse current detection signal S4 (a detection result of the reverse current detection circuit Y) but the input of the PWM signal S3, as the gate signal G13 thereof. Accordingly, the switch B3 is turned on during the on period of the output transistor 111 and is turned off during the off period of the output transistor 111. In other words, an offset is added to the slope voltage V2 during the entire off period of the output transistor 111.

The current source B5 is connected between the first terminal of the resistor B2 and the ground terminal, and generates a current I3 that is smaller than the current I2. Accordingly, when the switch B3 is turned off, a differential current (=I2−I3), which is obtained by subtracting the current I3 from the current I2, flows in the resistor B2. As a result, a voltage (=(I2−I3)×R) is generated between both terminals of the resistor B2 in accordance with the differential current described above, and this voltage between the both terminals is the offset to be added to the slope voltage V2.

In other words, the offset in the third structural example (=(I2−I3)×R) is smaller than the offset in first structural example or the second structural example (=I2×R) by a decrease of the current flowing in the resistor B2 (=I3×R).

Further, although the example based on the second structural example (FIG. 8) is illustrated in FIG. 10, it is possible to use the first structural example (FIG. 6) as the base. In that case, the inverter B4 that receives the input of the reverse current detection signal S4 is eliminated, and a signal output from the output terminal (Q) of the logic circuit A5 (corresponding to a logically inverted signal of the gate signal G11 or G12) is input as the gate signal G13 to the switch B3. Alternately, without eliminating the inverter B4, instead of the reverse current detection signal S4, a signal output from the inverting output terminal (QB) of the logic circuit A5 (corresponding to the gate signal G11 or G12) is input to the inverter B4.

Figure 11:
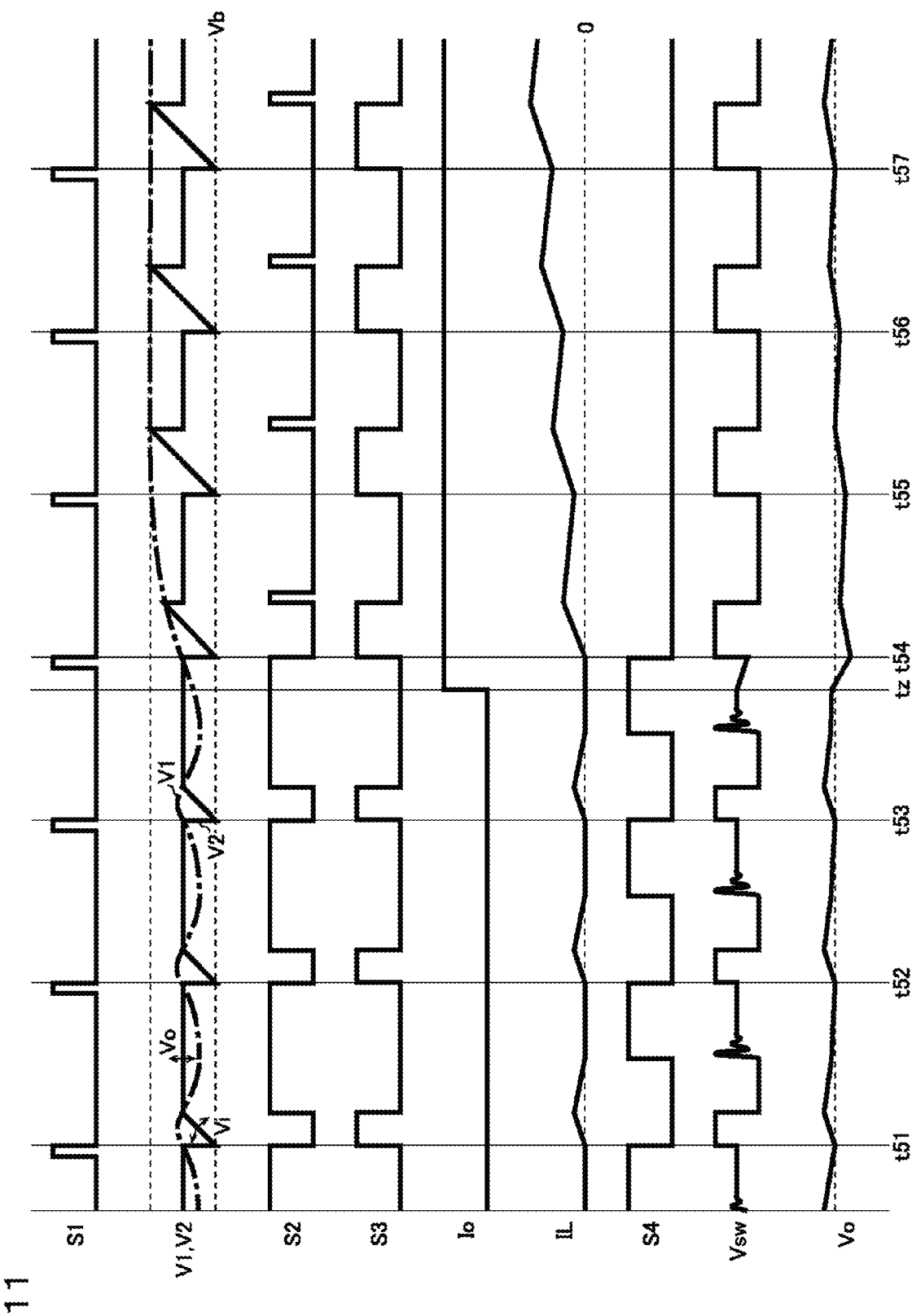
FIG. 11 is a timing chart illustrating a third example of the output fluctuation when a load rapidly increases.

FIG. 11 is a timing chart illustrating a third example of the output fluctuation when a load rapidly increases (a behavior when the slope voltage generating circuit 160 of a third structural example is adopted), and shows the clock signal S1, the error voltage V1 (a solid line) and the slope voltage V2 (a dot-dashed line), the comparison signal S2, the PWM signal S3, the output current Io, the inductor current IL, the reverse current detection signal S4, the switch voltage Vsw, and the output voltage Vo, in order from top to bottom.

In a switching period between time points t51 and t52, and in a switching period from the time point t52 to a time point t53, in the same manner as the period between the time points t21 and t24 illustrated in FIG. 3, output behaviors in a light load with small output current To are illustrated. In these switching periods, the inductor current IL is below zero during the on period of the synchronous rectifying transistor 112 (the low level period of the PWM signal S3). Accordingly, the reverse current detection signal S4 rises to the high level, and the reverse current cut-off operation described above is performed.

Further, in each of the switching periods, the slope voltage V2 is temporarily decreased to the reset level (i.e., the bias voltage Vb) by a trigger of a rising edge of the PWM signal S3 (or the falling edge of the clock signal S1), and then is increased with the gradient corresponding to the input voltage Vi. After that, the slope voltage V2 is maintained at a bias level corresponding to the output voltage Vo by a trigger of a falling edge of the PWM signal S3 (or the rising edge of the comparison signal S2).

Note that the gradient of the slope voltage V2 depends on the input voltage Vi, while the offset level of the slope voltage V2 depends on the output voltage Vo. Accordingly, the voltage level of the slope voltage V2 at the intersection with the error voltage V1 (the slope height) can agree with the offset level of the slope voltage V2.

With this offset operation, it is possible to intentionally increase the error voltage V1, and hence the error voltage V1 is not decreased close to the reset level of the slope voltage V2 even in a light load.

In a switching period from the time point t53 to a time point t54, a rapid increase of the output current To (a change from a light load to a heavy load) occurs at a time point tz during the reverse current cut-off operation. In this case, the output transistor 111 and the synchronous rectifying transistor 112 are both turned off. Accordingly, in a period after the time point tz until a next switching period comes, the output current Io is supplied only by the charge stored in the output capacitor 114. As a result, after the time point tz, the output voltage Vo and the switch voltage Vsw are decreased along with the lapse of time. In addition, in reflection of a decrease of the output voltage Vo, the error voltage V1 starts to increase to a voltage level corresponding to a difference between the feedback voltage Vfb and the reference voltage Vref.

In a switching period from the time point t54 to a time point t55, the PWM signal S3 rises to the high level by a trigger of the falling edge of the clock signal S1 so that the output transistor 111 is turned on, and hence the output voltage Vo is changed to increase. In addition, at this time point, the error voltage V1 has reached substantially the inherent voltage level (i.e., the voltage level corresponding to a difference between the feedback voltage Vfb and the reference voltage Vref). Accordingly, the on period of the output transistor 111 can be sufficiently secured, and hence the output voltage Vo can be quickly raised to the target value.

In a switching period from the time point t55 to a time point t56, and in a switching period from the time point t56 to a time point t57, the error voltage V1 has already reached the inherent voltage level, and therefore the output voltage Vo can be quickly increased following the previous switching period.

In this way, by adopting the slope voltage generating circuit 160 of the third structural example, in the same manner as the first structural example or the second structural example, it is possible to intentionally increase the error voltage V1 in a light load. Accordingly, a fluctuation range of the error voltage V1 when a load rapidly increases can be reduced, and hence load responsiveness can be improved.

In addition, by adopting the slope voltage generating circuit 160 of the third structural example, the offset function equivalent to that of the first structural example or the second structural example can be realized without using the reverse current detection signal S4. Accordingly, also in the switching power supply device 100 in which the controlling semiconductor device Z1 is separated from the driving semiconductor device Z2 (see FIG. 9B or 9C), the load responsiveness can be improved without disposing additional external terminals.

<Supplementary Description of Operation Principle>

Figure 12:
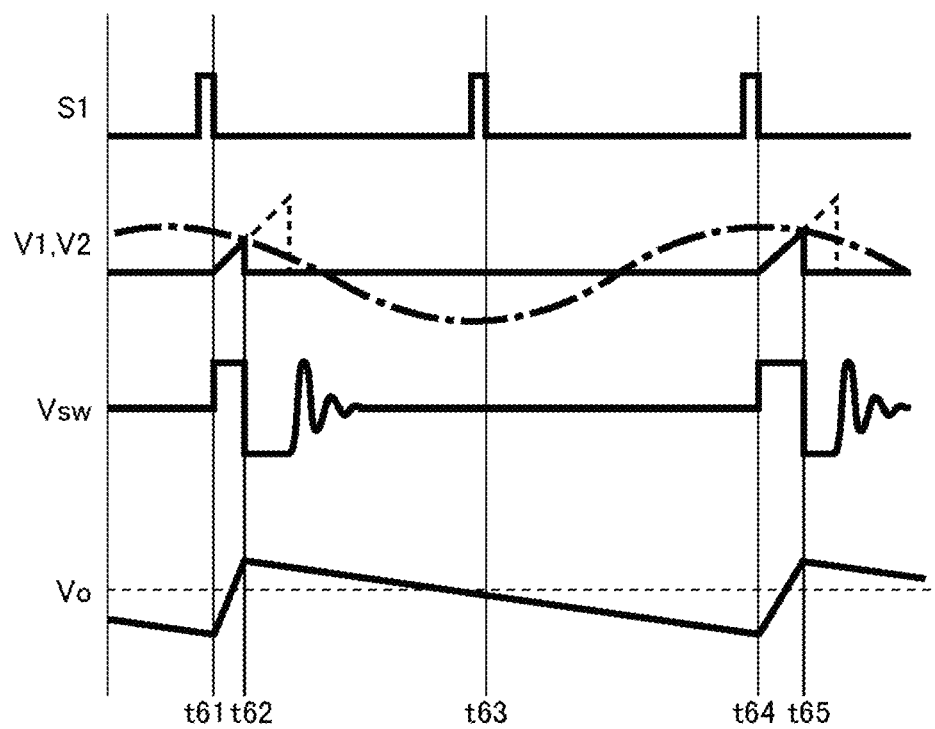
FIG. 12 is a timing chart for explaining an operation principle (in a light load without an offset)
Figure 13:
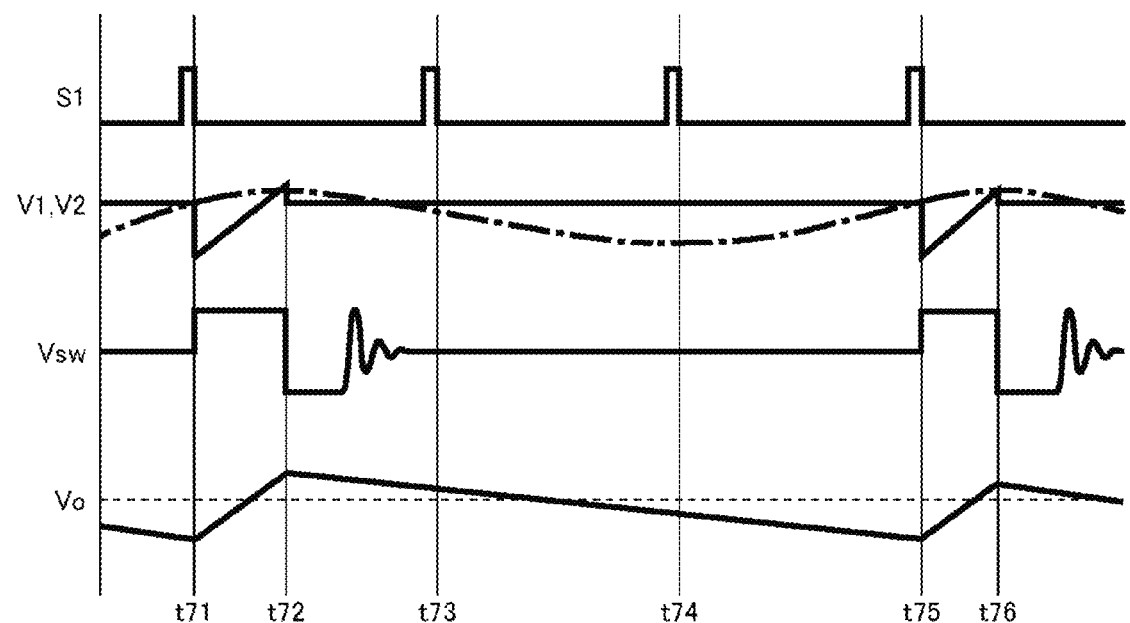
FIG. 13 is a timing chart for explaining an operation principle (in a light load with the offset)

FIGS. 12 and 13 are timing charts for supplementary description of the operation principle, and shows the clock signal S1, the error voltage V1 and the slope voltage V2, the switch voltage Vsw, and the output voltage Vo, in order from top to bottom. Note that FIG. 12 illustrates behaviors in a light load without the offset, and FIG. 13 illustrates behaviors in a light load with the offset.

When the output voltage Vo is higher than the target value, the error voltage V1 is decreased. On the contrary, when the output voltage Vo is lower than the target value, the error voltage V1 is increased.

In addition, the switch voltage Vsw rises from the low level to the high level at a pulse edge of the clock signal CLK, and the switch voltage Vsw is decreased from the high level to the low level when the error voltage V1 crosses the slope voltage V2. However, if the error voltage V1 is lower than the slope voltage V2, the switch voltage Vsw does not rise from the low level to the high level when the pulse edge of the clock signal CLK comes.

Specific description is added with reference to FIG. 12. In a period between time points t61 and t62, and in a period between time points t64 and t65, the switch voltage Vsw becomes the high level so that the output voltage Vo is increased. In this case, when the output voltage Vo becomes higher than the target value, the error voltage V1 is changed to decrease. Note that an offset is not added to the slope voltage V2, and hence a pulse width (the high level period) of the switch voltage Vsw is small. In addition, the slope voltage V2 itself is lower than that in a heavy load.

At a time point t63, the error voltage V1 is lower than the slope voltage V2, and hence a pulse edge of the clock signal S1 is neglected. As a result, when the output voltage Vo becomes lower than the target value, the error voltage V1 is changed to increase.

Next, specific description is added with reference to FIG. 13. In a period between time points t71 and t72, and in a period between time points t75 and t76, the switch voltage Vsw becomes the high level so that the output voltage Vo is increased. In this case, when the output voltage Vo becomes higher than the target value, the error voltage V1 is changed to decrease. Note that an offset is added to the slope voltage V2, and hence it is understood that the pulse width (the high level period) of the switch voltage Vsw is larger than that in FIG. 12.

At time points t73 and t74, the error voltage V1 is lower than the slope voltage V2, and the pulse edge of the clock signal S1 is neglected. As a result, when the output voltage Vo becomes lower than the target value, the error voltage V1 is changed to increase.

<Application to Personal Computer>

Figure 14:
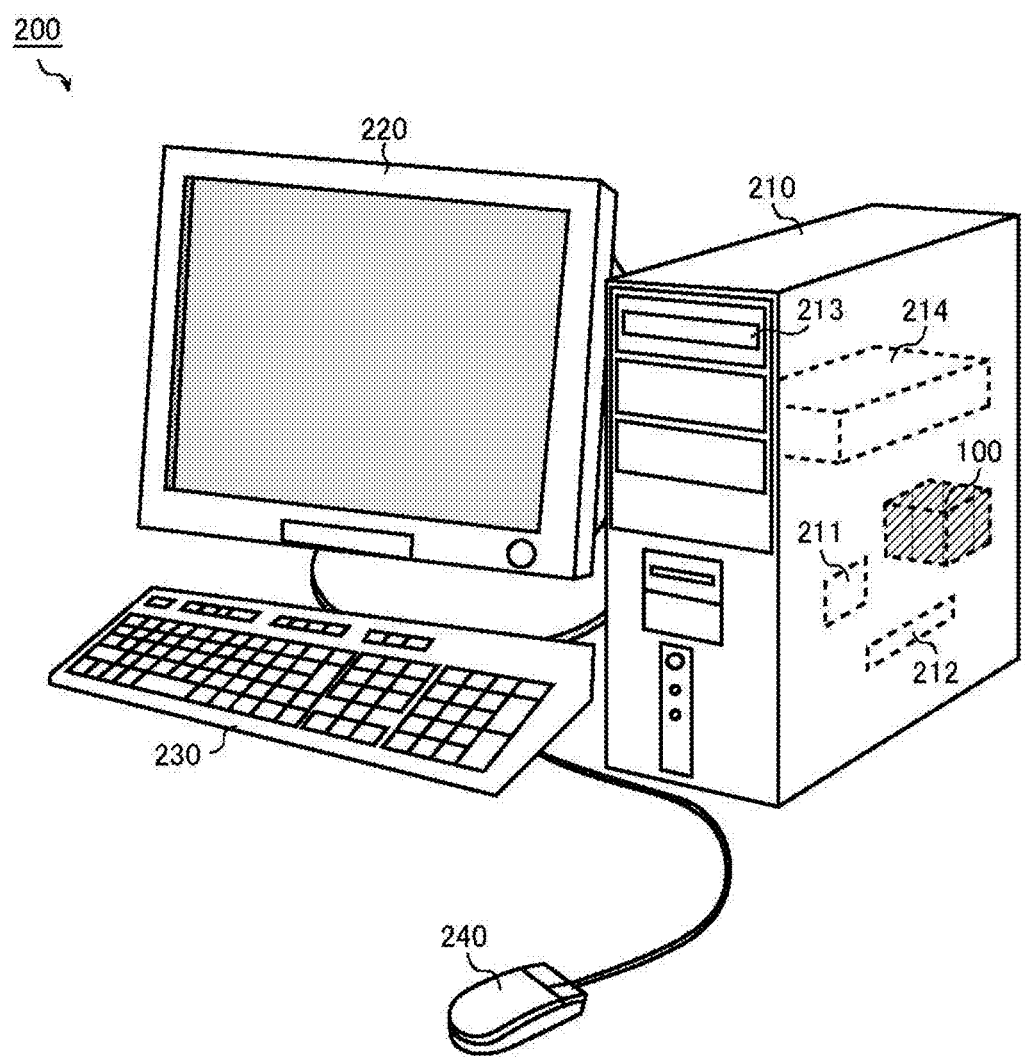
FIG. 14 is an outside view of a desktop personal computer equipped with the switching power supply device.

FIG. 14 is an outside view of a personal computer equipped with the switching power supply device 100. A personal computer 200 of this structural example includes a main body case 210, a liquid crystal monitor 220, a keyboard 230, and a mouse 240.

The main body case 210 houses a CPU 211, a memory 212, an optical drive 213, a hard disk drive 214, and the switching power supply device 100.

The CPU 211 executes an operating system and various application programs stored in the hard disk drive 214 so as to integrally control an operation of the personal computer 200.

The memory 212 is used as a working area of the CPU 211 (e.g. an area for storing task data when the program is executed).

The optical drive 213 performs a read/write operation on an optical disc. As the optical disc, there are a compact disc (CD), a digital versatile disc (DVD), a Blu-ray disc (BD) and the like.

The hard disk drive 214 is one of a mass auxiliary storage device using a magnetic disk enclosed in a case for non-volatile storage of programs and data.

The liquid crystal monitor 220 displays images on the basis of instructions from the CPU 211.

The keyboard 230 and the mouse 240 are human interface devices that receive user's operation.

As power supply means of the personal computer 200 having the structure described above, the switching power supply device 100 described above is used, and hence the output voltage Vo can be maintained at a desired value even if the CPU 211 is resumed from a sleep state (light load state) to a normal state (a heavy load state), for example.

<Other Variation>

Further, various technical features disclosed in this specification, other than the embodiment described above, can be variously modified within the scope of the technical invention without deviating from the spirit thereof. In other words, the embodiment described above is merely an example in every aspect and should not interpreted as limiting the scope of the present invention. The technical scope of the present invention is defined not by the above description of the embodiment but by the claims, which should be interpreted to include all modifications within the claims and equivalent meanings and scope thereof.

INDUSTRIAL APPLICABILITY

The invention disclosed in this specification can be generally used for switching power supply devices (e.g., a power supply for a CPU that is required to have high load responsiveness).

What is claimed is:

1. A switching power supply device comprising:
    a switching output circuit arranged to drive an output inductor by turning on and off an output transistor and a synchronous rectifying transistor, so as to generate an output voltage from an input voltage;
    an error amplifier arranged to generate an error voltage corresponding to a difference between a predetermined reference voltage and the output voltage or a feedback voltage in proportion to the output voltage;
    a slope voltage generating circuit arranged to generate a slope voltage;
    a pulse width modulation (PWM) comparator arranged to compare the error voltage with the slope voltage so as to generate a comparison signal;
    a logic circuit arranged to receive an input of the comparison signal so as to generate a pulse width modulation signal;
    a switch driving circuit arranged to receive an input of the pulse width modulation signal so as to generate a drive signal of the switching output circuit, and a reverse current detection circuit arranged to detect a reverse current of an inductor current that flows in the output inductor so as to forcibly turn off the synchronous rectifying transistor, wherein
    the slope voltage generating circuit increases the slope voltage from a reset level with a gradient corresponding to the input voltage during an on period of the output transistor, while it maintains the slope voltage not at the reset level but at an offset level corresponding to the output voltage during at least a part of an off period of the output transistor.

2. The switching power supply device according to claim 1, wherein, the slope voltage generating circuit includes
    a charge/discharge unit arranged to allow a first current corresponding to the input voltage to follow in a capacitor so as to generate the slope voltage, and
    an offset unit arranged to allow a second current corresponding to the output voltage to flow in a resistor so as to add an offset to the slope voltage.

3. The switching power supply device according to claim 2, wherein the charge/discharge unit includes
    a first current source connected between the power supply terminal and an output terminal of the slope voltage so as to generate the first current corresponding to the input voltage,
    a capacitor having a first terminal connected to an output terminal of the slope voltage,
    a first switch connected between the power supply terminal and the first current source, and
    a second switch connected between both terminals of the capacitor, and wherein the offset unit includes
    a resistor having a first terminal connected to a second terminal of the capacitor and a second terminal connected to an application terminal of the bias voltage,
    a second current source connected between the power supply terminal and a first terminal of the resistor so as to generate a second current corresponding to the output voltage, and
    a third switch connected between both terminals of the resistor.

4. The switching power supply device according to claim 3, wherein the first switch is turned on during the on period of the output transistor and is turned off during the off period of the output transistor, while the second switch is turned off during the on period of the output transistor and is turned on during the off period of the output transistor.

5. The switching power supply device according to claim 3, wherein the third switch receives a detection result of the reverse current detection circuit, so as to be turned on when a reverse current of the inductor current is not detected, and turned off when the reverse current of the inductor current is detected.

6. The switching power supply device according to claim 3, wherein
    the offset unit further includes a third current source connected between the first terminal of the resistor and a ground terminal so as to generate a third current smaller than the second current, and
    the third switch is turned on during the on period of the output transistor and turned off during the off period of the output transistor, without receiving a detection result of the reverse current detection circuit.

7. The switching power supply device according to claim 6, wherein the error amplifier, the slope voltage generating circuit, the PWM comparator, and the logic circuit are integrated into a first semiconductor device, while the switching output circuit, the switch driving circuit, and the reverse current detection circuit are integrated into a second semiconductor device.

8. The switching power supply device according to claim 1, wherein the switching output circuit is one of a step-down type, a step-up type, a step-up/down type, and an inverting type.

9. An electronic device comprising:
    the switching power supply device according to claim 1; and
    a load arranged to operate on supply of the output voltage from the switching power supply device.

10. The electronic device according to claim 9, wherein the load is a central processing unit (CPU).

* * * * *